United States Patent [19]

Sandquist

[11] Patent Number: 5,612,954
[45] Date of Patent: Mar. 18, 1997

[54] TIME SWITCH SYSTEM

[75] Inventor: Jan P. W. Sandquist, Huddinge, Sweden

[73] Assignee: Telefonaktiebolaget LM Ericsson, Stockholm, Sweden

[21] Appl. No.: 426,651

[22] Filed: Apr. 21, 1995

[30] Foreign Application Priority Data

Apr. 29, 1994 [SE] Sweden .................. 9401471

[51] Int. Cl.⁶ .................................................. H04Q 11/08
[52] U.S. Cl. ........................ 370/244; 370/377; 370/447
[58] Field of Search ............................ 370/58.1, 13, 66, 370/68.1, 67, 68, 85.1, 85.2, 85.3, 85.9, 85.11, 112, 110.1; 340/825.06, 825.16, 825.17; 364/940, 942, 942.03; 327/365

[56] References Cited

U.S. PATENT DOCUMENTS

| | | | |
|---|---|---|---|
| 4,253,179 | 2/1981 | Shimizu ....................... | 370/67 |
| 4,613,858 | 9/1986 | Davidson et al. ........... | 340/825.5 |
| 4,656,471 | 4/1987 | Hanss et al. ................ | 340/825.16 |
| 4,873,694 | 10/1989 | Schmidt et al. ............. | 370/58.1 |
| 4,905,227 | 2/1990 | Lechner et al. ............. | 370/67 |
| 5,086,427 | 2/1992 | Whittaker et al. ........... | 370/85.1 |
| 5,105,421 | 4/1992 | Gingell ....................... | 370/67 |
| 5,151,896 | 9/1992 | Bowman et al. ............. | 370/85.13 |
| 5,153,455 | 10/1992 | Walters, Jr. ................. | 326/114 |
| 5,345,447 | 9/1994 | Noel ........................... | 370/67 |
| 5,398,240 | 3/1995 | Nakashima et al. .......... | 370/85.1 |
| 5,469,434 | 11/1995 | Kurdzo et al. ............... | 370/67 |

FOREIGN PATENT DOCUMENTS

| | | |
|---|---|---|
| 254559 | 1/1988 | European Pat. Off. . |
| 396119 | 11/1990 | European Pat. Off. . |

*Primary Examiner*—Benedict V. Safourek
*Assistant Examiner*—Ricky Ngo
*Attorney, Agent, or Firm*—Burns, Doane, Swecker & Mathis, L.L.P.

[57] ABSTRACT

A digital time switch system includes a switch core and a number of switch ports. The digital time switch system is intended for use in a telecommunication network, in which the switch ports share the bandwidth of a bus by time-division multiplexing. The bus is separated into time slots that are assembled into frames. Data transmission between the switch ports is performed in time slots that have been assigned to a respective switch port by a superior control unit so as to prevent bus conflict. Each switch port has access to the whole bandwidth of the bus and chooses through the superior control unit the data which is intended for the switch port. Logic in the switch ports is arranged to give a certain logical value to data directed to the switch core and appearing in unassigned time slots. The switch core includes a multiplexing device for multiplexing data from the switch ports through bit by bit logical operations so that time slots, to which a certain logical value has been allotted, do not actively contribute in the operations.

16 Claims, 4 Drawing Sheets

TIME SWITCH SYSTEM

BACKGROUND

Generally, the invention relates to a switch system in which circuit switching is performed in a distributed time switch in which time switching units are located in switch ports connected to a time shared medium in a switch core.

More particularly, the present invention relates to a digital time switch system which includes a switch core and a number of switch ports and is intended to be used in a telecommunication network, in which the switch ports share the bandwidth of a bus by time-division multiplexing, on which the time is divided into time slots which are assembled in frames, data transmission between the switch ports is performed in time slots which have been assigned to a respective switch port by a superior control means so as to avoid bus conflict, and each switch port has access to the whole bandwidth of the bus and by means of the superior control means selects the data which is intended for the switch port.

In switch systems wherein the switch core consists of a common time shared medium the switch core can be very simple. In known systems of this kind the switch core often consists of only a passive bus.

One advantage of switch systems of this type is that the costs of the switch core become low, whereby higher cost modularity can be attained for scaleable systems. Since the switch core constitutes a fixed basic cost for a system, the total cost for small systems can be lower when the cost of the switch core is low, whereby the cost efficiency becomes better for these small systems.

A passive bus can, however, suffer from several problems. One problem is that erroneously appearing switch ports can disturb the function of the bus by driving it at points of time which have been assigned to other switch ports. This can result in bus conflict.

Another problem is the high frequency properties of the bus. More particularly, at high frequencies impedance adaption is required, since the bus then has the character of a transmission line. For different reasons the bus is, however, difficult to impedance match, and therefore the bandwidth is thus in reality strongly limited.

A further problem that can appear in connection with a passive bus is related to error detection. It is difficult to identify a disturbing switch port since several potentially erroneous switch ports can drive common electrical nodes, i.e. the node or nodes of which the bus consists.

U.S. Pat. No. 5,153,455 describes a digital communication system wherein a plurality of IC circuits can communicate with each other via a common bus. The communication from the circuits to the bus is performed by means of an OR function admitting that an arbitrary circuit can communicate with all other circuits.

From U.S. Pat. No. 5,086,427 a system appears wherein a plurality of terminals communicate through drive units via a common system bus. The drive units are each controlled by individual logical control units in the form of AND gates. By making the control signal to a drive unit assume the logical value 0 during a time period in which the unit is not allowed to use the bus, it is avoided that more units use the bus simultaneously. More particularly, this is attained by the output of a clock controlled flipflop forming one of the inputs of the logical control unit.

U.S. Pat. No. 4,656,471 describes a system for connecting a user to a bus without the bus becoming blocked in case of an error, if any, in the user terminal. The terminal is put into contact with the bus via a switch which is conducting if a control signal connected thereto indicates that the terminal operates as it should. Otherwise the switch breaks.

U.S. Pat. No. 4,613,858 relates to a method for decreasing the risk for bus error due to terminal errors. This is attained by the drive circuit of the terminal being controlled by an output signal from an AND gate the inputs of which are connected to two control signals. The two control signals which define the time interval in which the terminal may send, are generated internally and externally which makes that an internal error does not affect the sending time.

EP 396,119 describes a method for multiplexing broad band signals by means of a plurality of logical elements such as NAND gates. From a number of input signals the desired input signal is selected by giving to the undesirable signals the logical value 0 by successive NAND operations.

U.S. Pat. No. 5,151,896 discloses a distributed digital telephone system wherein each switch port contains switch and control functions. The switch ports are connected to TDM buses. In case of an error there is a possibility to disconnect the part of the system being faulty, without affecting the rest of the system.

SUMMARY

In a switch system for circuit switching consisting of time switching units located in switch ports and interconnected by means of a common time shared medium in a switch core, the object of the invention is to eliminate problems of the kind mentioned above which may appear on a passive bus, while maintaining a comparably low cost for the switch core.

According to the invention this has been attained in that logical means in the switch ports impart a certain logical value to data directed to the switch core and appearing in not assigned time slots, and the core contains a multiplexing means for multiplexing data from the switch ports through bit by bit logical operations in a way that data having been imparted said particular logical value do not give any active contribution to the operations. The logical operations can be OR operations.

According to a first advantageous and important embodiment there are means in the switch core for detecting erroneous switch ports and preventing these from taking part in the multiplexing.

According to a second advantageous and important embodiment there are means in the switch core for detecting bus conflict and reporting such to the superior control means.

Preferably each time slot can have associated therewith a flag in each switch port, to which the superior control means imparts a first logical value, e.g. 1, for indicating that the corresponding time slot has been assigned to the switch port, and a second logical value, e.g. 0, respectively, if it has not been assigned to the switch port, said logical value together with the data of the time slot being supplied to each an input of a logical circuit, the output of which is connected to the switch core. For processing data in parallel form an AND circuit is used for each bit.

According to a further advantageous and important embodiment the switch core consists of a number of units connected into a chain, which are each associated with a respective switch port, the multiplexing means being distributed on the port associated units and realized in a way that the outputs from a set of logical gates, e.g. OR gates, performing said logical operations in a unit in the chain of port associated units are interconnected with respective inputs of a corresponding set of gates, e.g. OR gates, in a later unit in the chain.

The input of the first port associated unit in the chain can be given the logical value 0, and on the output of the last unit in the chain the multiplex is presented that constitutes the end result of the OR operations.

Furthermore the multiplex from the last unit in the chain can be supplied to inputs of each unit in the chain to be forwarded to the corresponding switch port.

By keeping one flag in each switch port statically set to 0 it can be secured that not only 1s are sent in a frame to the switch core, this being used for error detection.

In a further advantageous embodiment an error detecting and error isolating means in each port associated unit can preferably be arranged for receiving data from the corresponding switch port before the multiplexing means for detecting erroneous switch ports and preventing data from them to take part in the multiplexing.

In that connection data arriving to the fault detecting and fault isolating means can be supplied in parallel form to the inputs of a NAND gate the output of which is connected to a 0-setting input of a counter which is set to 0 for each incoming bit which is 0, and the outputs of which are connected to a comparison circuit, the output of which is set to 0 if the counter value is equal to or exceeds the number of time slots in a frame, and is connected to a counter input of the counter, and to a control input of AND gates, the respective second input of which is likewise supplied with one each of the parallel data arriving to the error detecting and error isolating means, data from an erroneous switch port being isolated and prevented by means of the AND gates from participating in the multiplexing.

The outputs of the AND gates can furthermore each form an input of the gates which perform said logical operations, and to the respective second input of which the result of the logical operations of a preceding port associated unit is provided.

In that connection the outputs of the AND gates can also form inputs to a first OR gate, the inputs of a second OR gate can be supplied with the result of the logical operations of a preceding port associated unit, the outputs of the two OR gates be connected to an input each of an AND gate, the output of which together with an input for bus conflict information forming inputs of a third OR gate, the output of which forms an input for bus conflict information of a next port associated unit in the chain, in a way that on the output from the third OR gate of a last port associated unit in the chain there is presented a signal indicating whether a bus conflict has been detected in the time slot.

According to the invention the switch core is thus provided with active components which are preferably integrated into a circuit which is e.g. located directly on the backplane of the system. Due to the active components, erroneously behaving switch ports may be disconnected in the switch core from the bus whereby they are prevented to disturb it. Furthermore, point to point connections (in a star structure) are thereby obtained, i.e. each switch port has its own electrical nodes of connection in the switch core which are not shared by other switch ports. This facilitates impedance match and fault localization.

By means of the invention a small size of the switch core is obtained, and thereby a low cost, while maintaining the possibility of being able to dynamically distribute the time slots of the bus arbitrarily between different switch ports. Each switch port can thus be allotted arbitrary free time slots for user data in the frame for sending data. According to the invention the multiplexing is performed through bit by bit logical operations in the switch core between data from the switch ports. A switch port sends a determined value in the time slots having not been allotted to the switch port, which do not actively contribute to the result of the operations. This particular value may e.g. be 0, whereby the multiplexing may be performed by OR operations. Thereby neither input switches nor control memories will be needed in the switch core, which will therefore become small.

The solution according to the invention results in a system with a small switch core, the possibility of being able to disconnect erroneously behaving switch ports from the time shared medium, simplified impedance match and simplified error detection.

BRIEF DESCRIPTION OF THE DRAWINGS

The invention will now be described more closely below with reference to the drawings, on which FIG. 1 generally illustrates a time switch system on which the invention is applicable.

DETAILED DESCRIPTION

The embodiment of the invention discussed below is included in a digital switch system based upon time-division multiplexing (TDM) and time switching. A plurality of switch ports can share the band width of a common bus, belonging to a switch core, by position addressed time-division multiplexing. In connection with such multiplexing the time is divided into intervals, e.g. 125 us, which are denominated frames. Each frame contains a number of time slots in which data may be transferred on the bus. The boundaries of the frame constitute time references which are commonly used by the switch ports for associating data in the time slots with logical connections on the bus. More particularly, data for a logical connection may be transferred in one or more time slots in each frame, the relative positions of which in the frame not being changed between frames following on each other. The time slots are managed by a superior control means, below denominated scheduler. By the scheduler time slots are allotted on the bus so as to prevent bus conflict from appearing.

Figure 1:
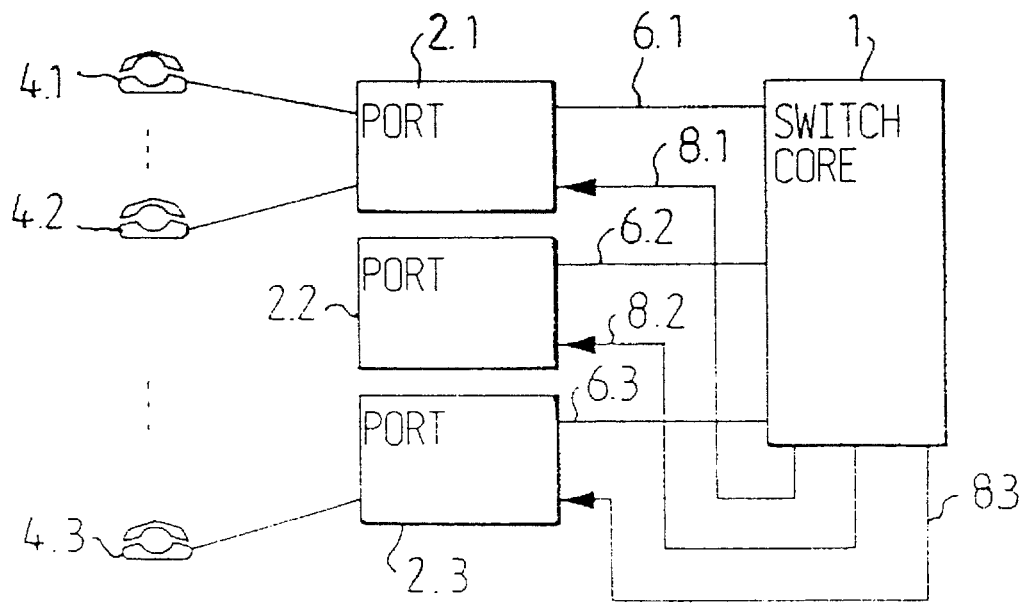

The switch system generally shown in FIG. 1 includes a number of switch ports 2.n interconnected with a switch core 1, for the sake of simplicity there being in this example three switch ports 2.1–2.3. To each switch port a plurality of user terminals can be connected, in FIG. 2 being e.g. represented by telephones 4.1–4.3. Each switch port is connected with the switch core 1 by means of a pair of oppositely directed communication channels 6.1–6.3 and 8.1–8.3, respectively.

Figure 2:
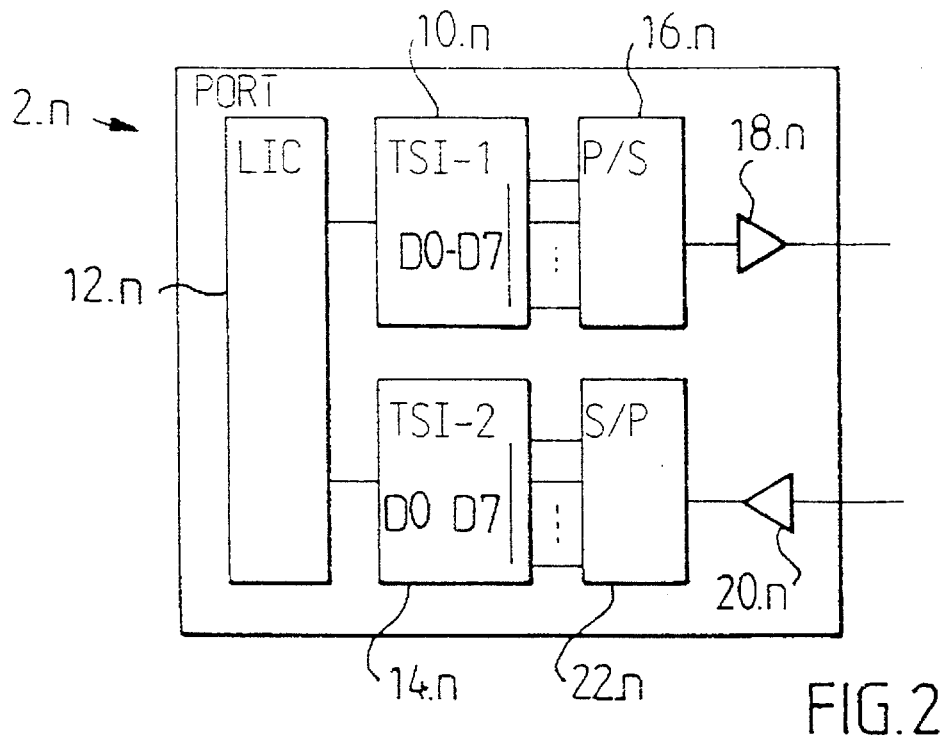
FIG. 2 shows an embodiment of a switch port in the system according to FIG. 1.

With reference to FIG. 2 a time switching unit 10.n is connected in each switch port 2.n for receiving incoming telecommunication traffic via a line circuit 12.n. In a similar way one time switching unit 14.n in each switch port 2.n is connected to the line circuit 12.n for forwarding outgoing traffic arising from the switch core 1. The line circuit 12.n, which may be of a kind known per se, can e.g. adapt the switch port so as to allow more user terminals to be connected, and for this purpose include a multiplexor/ demultiplexor.

The output of the time switching unit 10.n is connected via a parallel/series converter 16.n and a drive circuit 18.n to the link 6.n. The link 8.n is connected to the input of the time switching unit 14.n via a receiver circuit 20.n and a series/ parallel converter 22.n.

Figure 3:
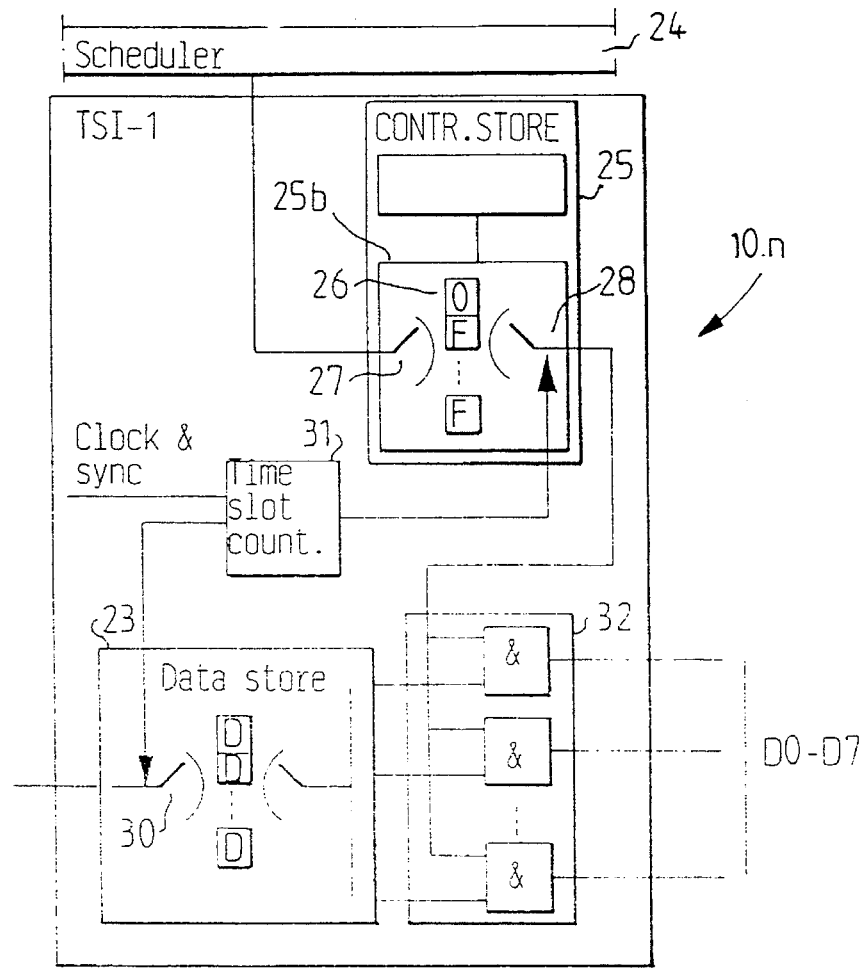
FIG. 3 shows an embodiment of a time switching unit located in a respective switch port.

With reference to FIG. 3, showing the time switching unit 10.n more in detail, the latter receives from the line circuit 12.n data which by reading and writing at different points of time in a data store 23 are delayed so as to be able to be supplied to the switch core in time slots provided for this purpose. The time slots are allotted to the switch ports 2.n by the above mentioned scheduler indicated at 24. Control information for the time slots is recorded in a control memory intended for this purpose and generally shown at 25. More particularly, the control memory 25 includes a part shown more in detail and designated 25b, but can otherwise be realized in a manner known per se.

In the control memory part 25b there is, for the sake of simplicity, a particular storing position 26, indicated by 0, in which a flag set statically to zero is stored. By this it is secured that in a frame not only 1s are sent to the switch core used for error detection in the switch core. This will appear more closely below. Each time slot in the frame furthermore has a corresponding storing position 26, in which a flag can be made to attain one or the other of the values 1 or 0 by the scheduler via an addressing logical unit 27. When the flag is set to 1 it indicates that the time slot related to the storing position has been allotted to the switch port, whereas when the flag is set to 0 it indicates that the time slot has not been allotted to the switch port. In the later case the output of the switch port takes the value 0 in this time slot.

The flags are read out from the control memory part 25b in the respective time slots by an addressing logical unit 28 and data are written into the data store 23 by an addressing logical unit 30. A time slot counter 31 controls the addressing logical unit 28 as well as the addressing logical unit 30 so as to synchronize the reading in the control memory part 25b and the writing in the data store 23. The units 28 and 30 may e.g. be included in RAM memories.

The output of the addressing logical unit 28 is connected to a respective first input of a number of AND gates 32 the respective second input of which is connected to a respective output from the data store 23. The AND gates 32 on their outputs take the value 0 in the time slots in which they receive 0s from the control memory on their first inputs, indicating in accordance with the above that time slots have not been allotted to the switch port, whereas the AND gates 32 otherwise transparently let through data from the data store 23.

Figure 4:
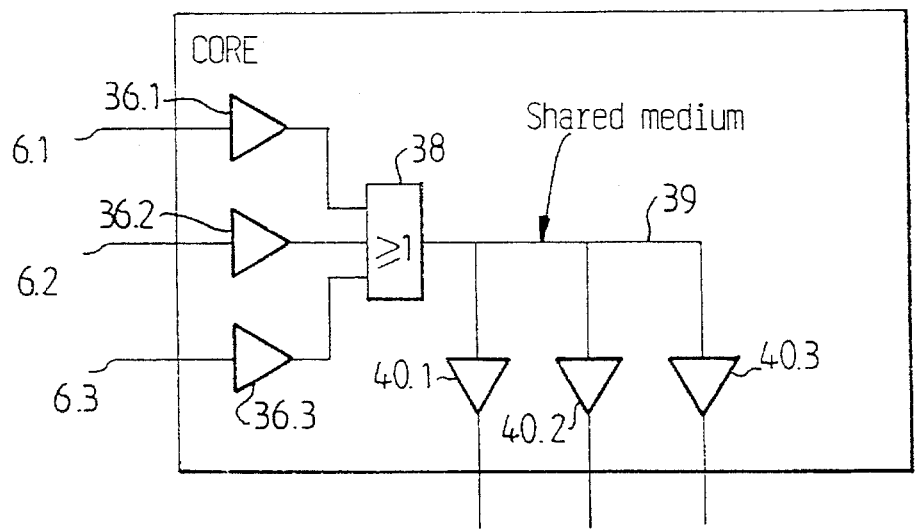
FIG. 4 illustrates the principle of multiplexing in the switch core.

With reference to FIG. 4, illustrating the multiplexing principle in the switch core 1, data on the communication channels 6.1–6.n are received in the switch core in receiver circuits 36.n, there being in the present example for the sake of simplicity three circuits 36.1–36.3. One bit from a respective switch port is supplied to the inputs of a generally shown multiplexing device 38 which performs an OR operation. Only one bit shall take one or the other of the values 0 or 1 in a time slot, i.e. the bit from the switch port to which the time slot has been allotted. Further bits shall be 0, whereby these do not actively affect the result of the OR operation, i.e. they have a recessive level. Contrary thereto, the bit being either 1 or 0 transparently passes the multiplexing means 38 due to the fact that the other bits are 0. Thereby multiplexing of data from the different switch ports is performed. The output from the multiplexing device 38 is connected to a common medium 39 ending in drive circuits 40.n, in the present example for the sake of simplicity three circuits 40.1–40.3, towards all switch ports. All switch ports therefore receive data from all time slots in a respective receiver circuit 20.n, as will be described more closely below.

Figure 5:
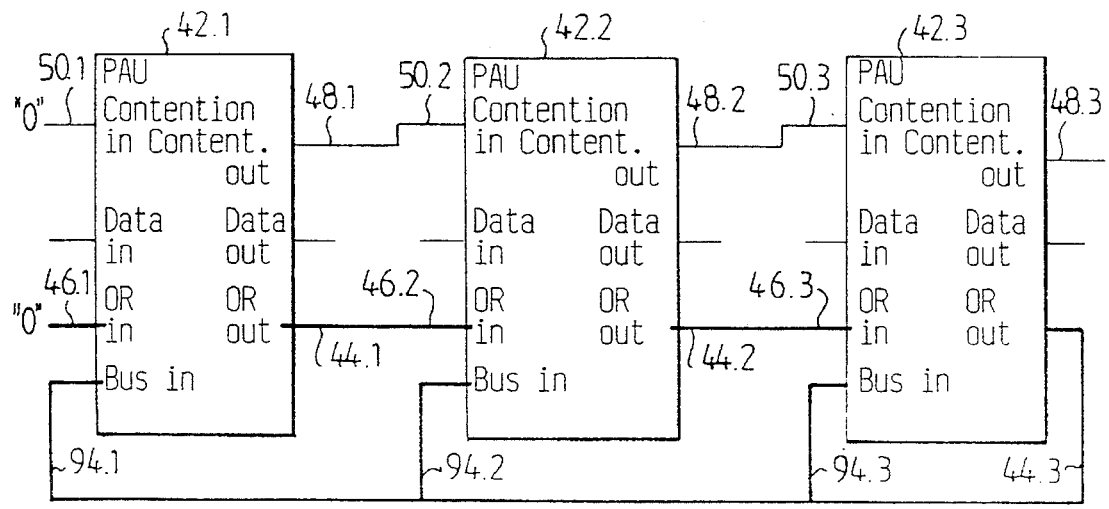
FIG. 5 shows an embodiment of the switch core.

A possible embodiment of the switch core 1 will now be described with reference to FIGS. 5 and 6. As particularly appears from FIG. 5 the switch core consists of a number of units 42.n interconnected into a chain, in the present example for the sake of simplicity three units 42.1–42.3, of which each is associated with a respective switch port 2.n.

The multiplexing device 38 is distributed on the port associated units 42.n and is formed by a set of OR gates 38.n(1–8) (cf. FIG. 6) in each port associated unit 42.n, outputs 44.n, e.g. 44.2, from one set of OR gates 38.n(1–8), e.g. 38.2(1)–38.2(8) in a unit 42.n, e.g. 42.2 being interconnected with the respective inputs 46.(n+1), e.g. 46.3, of a corresponding set of OR gates 38.(n+1)(1–8), e.g. 38.3(1)–38.3(8) in a later unit 42.(n+1), e.g. 42.3. The inputs 46.1 of a first set of OR gates 38.1(1)–38.1(8) in a unit 42.1 is given the value 0, as appears from FIG. 5. The outputs 44.n, e.g. 44.3, of the OR gates 38.n(1–8), e.g. 38.3(1)–38.3(8) in the last port associated unit 42.n, e.g. 42.3 in the chain, correspond to the output of the generally shown multiplexing device 38 in FIG. 4. The multiplexing is performed by successive bit by bit OR operations, as will appear more closely from the description below.

Bus conflict information is guided from one port associated unit to another one in the chain. The output 48.n, e.g. 48.2 from an OR gate 49.n, e.g. 49.2, of a port associated unit 42.n, e.g. 42.2, is interconnected with an input 50.(n+1), e.g. 50.3 of a corresponding OR gate 49.(n+1), e.g. 49.3 in a later port associated unit 42.(n+1), e.g. 42.3 in the chain. The input 50.1 of the OR gate 49.1 in the first port associated unit 42.1 is given the value 0. The output 48.n from the OR gate 49.n, e.g. 49.3, in the last port associated unit 42.n, e.g. 42.3 in the chain indicates, when it is set to 1 that more than one switch port carries active data in one and the same time slot, which will appear more closely from the description below.

Figure 6:
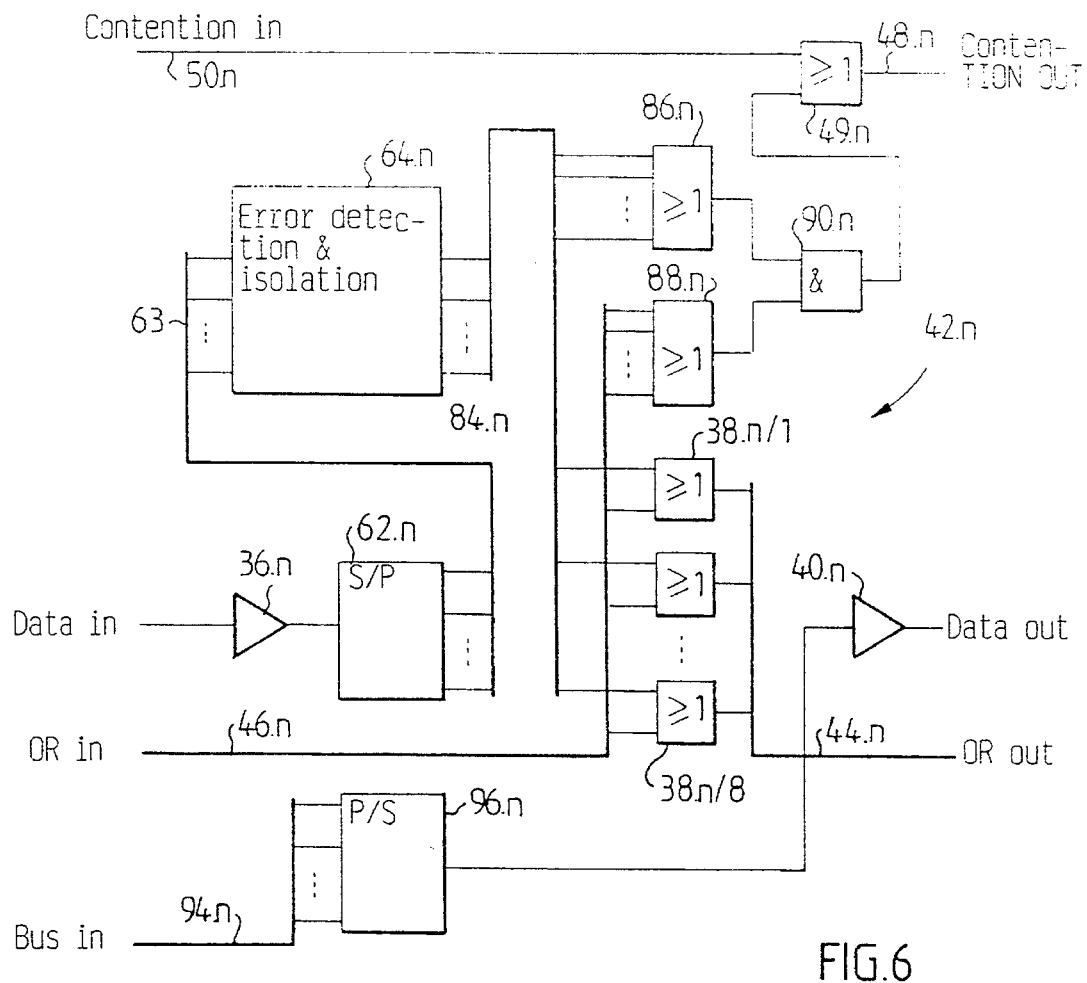
FIG. 6 shows a unit included in the switch core according to FIG. 5 in several instances, one for each switch port.

A port associated unit 42.n is shown more in detail in FIG. 6. Data from the corresponding switch port 2.n on the communication channel 6.n is received in serial form in a receiver circuit 36.n, cf. FIG. 4, and is passed on to a series/parallel converter 62. From there data is sent in parallel form to the input 63 of an error detecting and error isolating device 64.

One form of error, e.g. caused by a short circuit, manifests itself by a switch port staticly driving its output to a high or low state. A high state is particularly critical since the multiplexing would be completely disabled if the error is not isolated. Before isolation can be performed the error must be detected. By the flag in a storing position 26 which is staticly set to 0, high as well as low states shall appear in each frame. The error can thus be detected by supervising the presence of a static high state.

Figure 7:
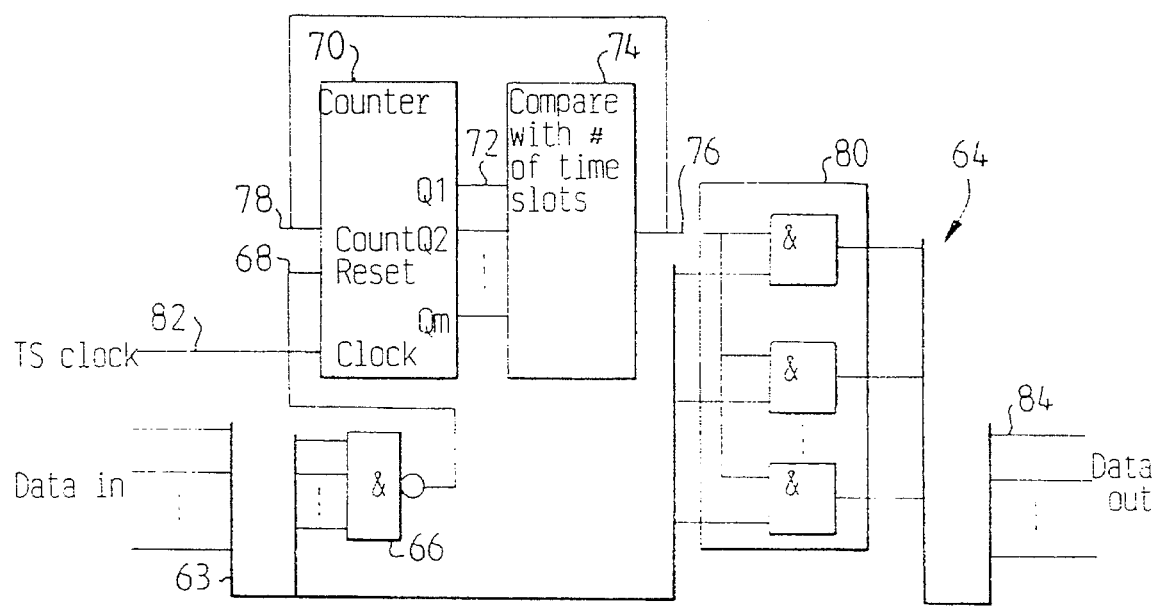
FIG. 7 shows a unit, included in the unit according to FIG. 6, for detecting and isolating errors.

The detection of a static high state appears from FIG. 7, which shows the device 64 more in detail. All bits from the converter 62 are supplied to i.a. the inputs of a NAND gate 66. The output of the NAND gate 66 is connected to a 0-setting input 68 of a counter 70. The outputs 72 of the counter 70 are connected to a comparison circuit 74 the output 76 of which is set to 0 if the counter value is equal to (or exceeds) the number of time slots in a frame. The output 76 is connected to a counter input 78 of the counter 70, and to a control input of AND gates 80, the other inputs of which are supplied with data from the input 63. A clock input of the counter 70 is shown at 82.

If any of the data bits on the input 68 of the counter 70 is 0, the counter is set to 0. If, contrary thereto, all data is 1, the counter steps up by one for each time slot. If all data statically consists of only 1s during a whole frame, the counter is stopped via the counter input 78 and the outputs 84 of the gates 80 become 0, otherwise the outputs 84 of the gates 80 reflect data arising from the input 63.

Another form of error, e.g. in the scheduler, can manifest itself by more switch ports claiming the same time slot. Thus several switch ports send active data in one and the same time slot. The error is detected in the switch core and is reported e.g. to the scheduler in a way not shown.

The outputs 84 from the device 64 are connected to an OR gate 86, which sets its output to 1 when data in a time slot are different from 0. Data from the input 46 are supplied to the inputs of an OR gate 88. When a data on the input 46 differs from 0 the output from the OR gate 88 will be set to 1. The outputs from the OR gate 86 and the OR gate 88 are connected to the inputs of an AND gate 90, the output of which together with the input 50.n form inputs to an OR gate 49, the output of which in turn forms the output 48.n. The output from the AND gate 90 is thereby set to 1 when data having appeared in the receiver circuit 36.n of the port associated unit in question, and data from any earlier port associated unit having appeared on the input 46 both are active simultaneously. By the OR gate 49 such a state is forwarded to the next port associated unit. The value 1 on the output 48.n from the last port associated unit 42.n thus indicates that a bus conflict has been detected in a port associated unit.

The OR gates 38.n(1)–38.n(8) in a port associated unit 42.n each correspond to a respective bit of the data in a time slot. Thus data with 8 bits is processed in parallel. Data from an earlier port associated unit in the chain is supplied to a respective input of the OR gates 38.n(1)–38.n(8), one bit to each OR gate. The outputs from the device 64.n are supplied to a respective second input of the OR gates 38.n(1)–38.n(8), one bit to each OR gate. Data on the output 50.n is furthermore forwarded to the next port associated unit in the chain.

The multiplexing is done in a way that OR operations in the port associated unit in question are performed between data from an earlier port associated unit, consisting of the multiplex of data from switch ports belonging to all earlier port associated units in the chain, and data from the switch port 2.n belonging to the port associated unit 42.n in question. Data resulting on the outputs 44 of the OR gates 38.n and consisting of a multiplex including the data of the switch port 2.n in question, are forwarded to the next port associated unit in the chain.

The multiplex from the outputs 44.n of the last port associated unit 42.n is supplied via inputs 94.1–94.n of all port associated units 42.1–42.n to a respective parallel/series converter 96.1–96.n. Data in serial form is thereafter supplied to the input of a drive circuit 40.n, cf. FIG. 4, the output of which is connected via a link 8.n to the receiver circuit 20.n in the corresponding switch port.

In the switch port series-to-parallel conversion of data from the switch core is performed in the converter 22.n. By means of the time switching unit 14.n the respective switch port selects the data which is particularly intended for the switch port and presents this to the line circuit 12.n. This can be performed in a way known per se.

For the sake of simplicity the processing of data has above been assumed to be performed with 8 bits in parallel, but another width is conceivable as well.

Furthermore, operations which have been described as including e.g. OR operations, can be re-formulated in a way that the operations instead include AND operations, without this conflicting with the spirit of the invention. For the man of the art it will be evident how the different embodiments may be changed in this respect.

As an example, the multiplexing device 38 illustrated generally in FIG. 4 and more in detail in FIG. 6 has been described as performing OR operations. The circuit solutions shown in the Figures can be easily modified for performing the multiplexing by AND operations.

Above it is also indicated as an example, with reference to FIG. 3, that the flags 26 are given the logical value 1 by the superior control unit for indicating that the time slot corresponding to the respective flag has been allotted to a switch port, and the value 0 if the time slot has not been allotted to the switch port. However, the opposite could be the case as well, and also here the required modifications of the described circuit solutions will be easily realized by the man of the art. Furthermore the invention, for the sake of simplicity, has only been described from the point of view of circuit switching. It should however be understood that the invention can also be applied to a system for integrated circuit and packet switching. Position addressed data and packets can share the time on the transmission links interconnecting the switch ports with the switch core, in a way known per se. In that connection data for circuit switching may be handled in such a system in accordance with the invention.

What is claimed is:

1. A digital time switch system comprising:
   a switch core including a bus having a bandwidth,
   a number of switch ports sharing said bandwidth by time-division multiplexing wherein time is divided into time slots assembled in frames,
   superior control means for assigning to said switch ports time slots in which data transmission between the switch ports is to be performed, based on information from said switch core to avoid bus conflict,
   logical means in the switch ports for imparting a certain logical value to data directed to the switch core, said data appearing in time slots having not been assigned by the superior control means, and
   multiplexing means in the switch core for multiplexing data from the switch ports through bit by bit logical operations in a way to prevent data, to which said certain logical value has been imparted, from giving any active contribution to the logical operations.

2. A time switch system according to claim 1, in which said logical operations are OR operations.

3. A time switch system according to claim 1, in which said switch core comprises means for detecting erroneous switch ports and preventing the erroneous switch ports from taking part in said multiplexing.

4. A time switch system according to claim 3, in which said switch core comprises means for detecting bus conflict and reporting such to said superior control means.

5. A time switch system according to claim 1, in which each switch port has a flag associated with a time slot, said superior control means has means for imparting to said flag a first logical value for indicating that a time slot has been allotted to the respective switch port, or a second logical value for indicating that a time slot has not been allotted the respective switch port, and the time switch system further comprises circuit means for supplying said logical value and data of the corresponding time slot to an input each of a logical circuit, an output of which is connected to the switch core.

6. A time switch system according to claim 5, in which said first and second logical values are 1 and 0, respectively, and said logical circuit is an AND circuit.

7. A time switch system according to claim 6, further comprising circuit means for processing data in parallel form including one said AND circuit for each bit of data.

8. A time switch system according to claim 1, in which said switch core comprises a number of units connected into a chain, which are each associated with a respective switch port, said multiplexing means has in each port associated unit a set of gates for performing said logical operations, each set of gates having outputs interconnected with inputs of a corresponding set of gates in a later port associated unit.

9. A time switch system according to claim 8, in which a logical value 0 is given to the inputs of said gates of a first port associated unit in said chain, and a multiplex constituting an end result of said logical operations is presented on the outputs of said gates of a last port associated unit in the chain.

10. A time switch system according to claim 9, in which said multiplex is supplied to bus inputs of each port associated unit in the chain to be forwarded to the corresponding switch port.

11. A time switch system according to claim 1, further comprising means for error detection based upon preventing transfer of only 1s in a frame from a switch port to said switch core.

12. A time switch system according to claim 11, in which a flag in each switch port statically is set to 0.

13. A time switch system according to claim 8, further comprising an error detecting and error isolating means in each port associated unit for receiving data from the corresponding switch port before said multiplexing means, for detecting erroneous switch ports and preventing data from the erroneous switch ports to take part in a multiplexing operation.

14. A time switch system according to claim 13, in which said error detecting and error isolating means comprises a NAND gate having inputs for receiving data in parallel form and an output, a bit counter having a 0-setting input connected to said output of said NAND gate, a counter input and outputs, said counter being set to 0 for each incoming bit having the value 0, a comparison circuit connected to said outputs of said counter, and having an output which is set to 0 if a received counter value is equal to or exceeds the number of time slots in a frame, and is connected to said counter input of said counter, and AND gates having each a control input connected to said output of said comparison circuit and having a respective second input for receiving the parallel data arriving to said error detecting and error isolating means, for isolating data from an erroneous switch port and preventing the isolated data from participating in said multiplexing.

15. A time switch system according to claim 14, in which the outputs of said AND gates of said error detecting and error isolating means are each connected to a first input each of said gates performing logical operations in said port associated units, said gates having a second input receiving the result of logical operations performed by said gates in a preceding port associated unit.

16. A time switch system according to claim 14, further comprising a first OR gate having inputs connected to the outputs of said AND gates, a second OR gate having inputs receiving the result of the logical operations performed in a preceding port associated unit, an AND gate having inputs connected to a respective output of said first and second OR gates, and a third OR gate having an input connected to the output of said AND gate and another input connected to receive bus conflict information, and an output forming an input for bus conflict information to a next port associated unit in said chain of port associated units, for presenting on the output from the third OR gate of a last port associated unit in the chain a signal indicating whether a bus conflict has been detected in a current time slot.

* * * * *